United States Patent

[11] 3,588,049

| [72] | Inventor | Andre Nectoux |
| | | Le Creusot, France |
| [21] | Appl. No. | 815,479 |
| [22] | Filed | Apr. 11, 1969 |
| [45] | Patented | June 28, 1971 |
| [73] | Assignee | Societe Des Forges et Ateliers Du Creusot |
| | | Paris, France |
| [32] | Priority | May 6, 1968 |
| [33] | | France |
| [31] | | 150,648 |

[54] TRACTION INSTALLATION FOR MOVING OBJECTS RUNNING ALONG A HORIZONTAL PLANE
3 Claims, 3 Drawing Figs.

[52] U.S. Cl. .................................................... 254/147,
212/27, 254/184, 104/173
[51] Int. Cl. ...................................................... E21c 29/16

[50] Field of Search................................................. 254/147,
184; 104/169, 173

[56] References Cited
UNITED STATES PATENTS
| 2,586,271 | 2/1952 | Stanley.......................... | 254/184 |
| 3,402,824 | 9/1968 | Zweifec......................... | 212/56 |

FOREIGN PATENTS
| 1,044,569 | 11/1953 | France ......................... | 254/147 |

*Primary Examiner*—Harvey C. Hornsby
*Attorney*—Cameron, Kerkam & Sutton

ABSTRACT: A traction installation, for example for an ingot truck, in which a pair of traction ropes each passes over a Koepe drive pulley on a frame pivotal about an axis parallel to the pulley axis. Each frame carries reduction gear and a drive gear, the latter coaxial with the frame pivot axis and coupled to planet wheel of a differential whose satellite carrier is coupled to a drive motor.

TRACTION INSTALLATION FOR MOVING OBJECTS RUNNING ALONG A HORIZONTAL PLANE

This invention relates to a traction installation for moving objects running along a horizontal plane, e.g. ingot trucks.

Ingot truck traction installations are already known which use a single cable but they have the disadvantage that the cable must have a relatively large diameter, and the same applies to the pulleys over which the cable runs, because of the forces involved.

Moreover, the cable is situated in the middle of the truck track and is therefore not protected from ingots dropping thereon when the latter are loaded or unloaded.

Ingot truck traction installations are also known which use two cables and such installations generally have two cable tensioning systems independent of the traction winch, one such system being provided for each cable (e.g. a counterweight acting on a movable carriage bearing a cable reversing pulley).

This invention relates to a traction winch which itself tensions the cables so that the ancillary systems conventionally used for this purpose are eliminated. More particularly, all the cable reversing pulleys have their axes fixed.

According to the invention, the system comprises two frames mounted to pivot about two axes in alignment with one another, each frame bearing a traction cable Koepe drive pulley, the axis of which is parallel to the frame pivot axis, two reduction gears each of which drives the spindle of one Koepe pulley and comprises a drive pinion the axis of which is in alignment with the frame pivot axes, a differential gear disposed between the reduction gears, the planet wheels of the differential gear being secured to the drive pinions and the satellite carrier cage being driven by at least one motor.

The invention will now be described in greater detail with reference to a specific embodiment which is given by way of example and illustrated in the drawings.

Figure 1:
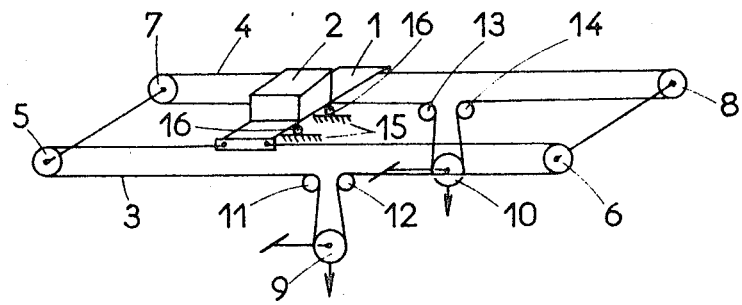
FIG. 1 is a highly diagrammatic view of an ingot truck driven by two parallel cables, each of which is driven by a Koepe pulley.

The ingot truck 1 shown in FIG. 1 carries an ingot 2 and is driven by two parallel cables 3 and 4.

These cables extend over reversing pulleys 5, 6, 7 and 8 and Koepe pulleys 9 and 10. Additional reversing pulleys 11, 12, 13 and 14 are provided to pass the cables over the Koepe pulleys 9 and 10.

The truck 1 moves along a track 15 by running gear, e.g. rollers 16.

Figure 3:
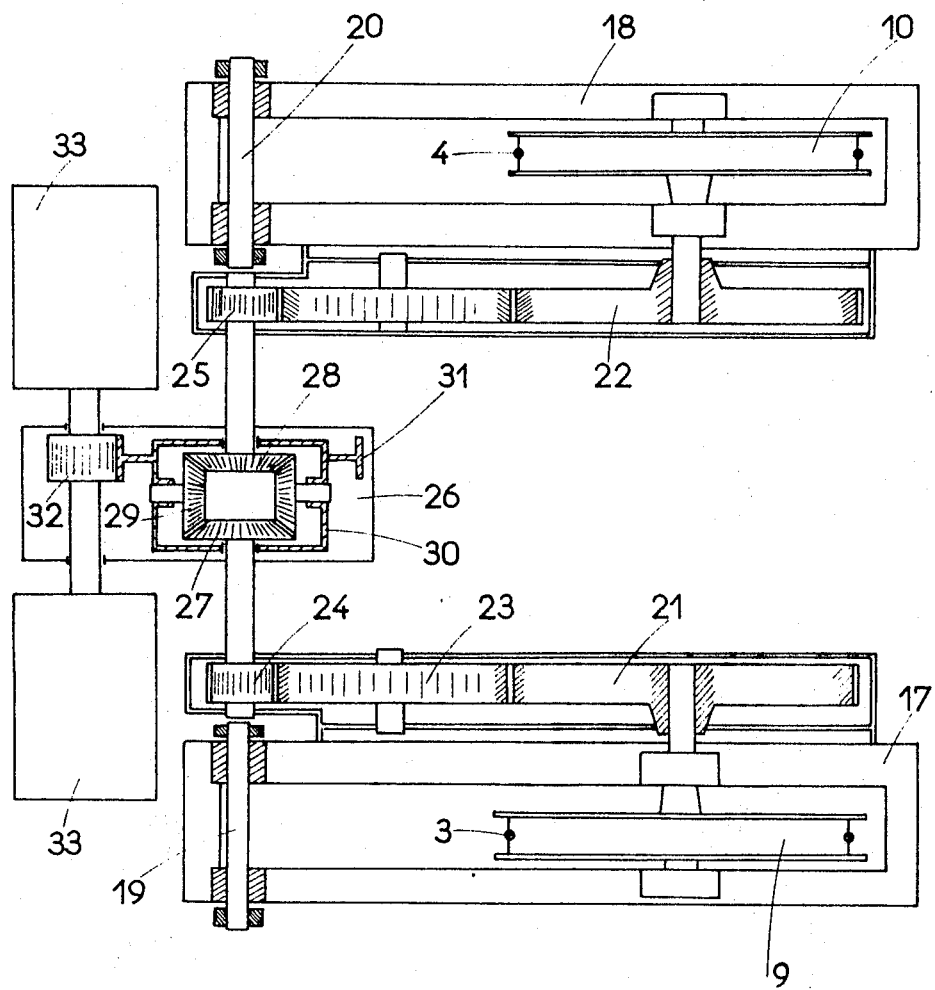
FIG. 3 is a plan view, partially in section, showing the complete drive system for the two cables.

The traction system comprises two frames 17 and 18 pivotable about pivots 19 and 20 which, as shown in FIG. 3, are in alignment with one another.

Each of the frames 17 and 18 bears the corresponding Koepe pulley 9, 10, the spindles of the latter being mounted in bearings secured to the frames.

The Koepe pulleys are driven through two reduction gears 21 and 22.

Each reduction gear comprises a gearwheel, e.g. 21, which is secured to the spindle of the corresponding Koepe pulley. Gearwheel 21 is driven by a gearwheel 23 meshing with a pinion 24.

The drive pinions 24 and 25 of the two reduction gears are in alignment with the pivots 19 and 20 of the frames 17 and 18. The system also comprises a differential gear 26. Each pinion 24 and 25 is secured to a planet wheel 27 or 28 of the differential 26 and the two planet wheels 27 and 28 engage the satellites 29 of the satellite carrier cage 30 of the differential gear. The cage is secured to a pinion 31 meshing with a pinion 32 driven by one or more motors 33.

Figure 2:
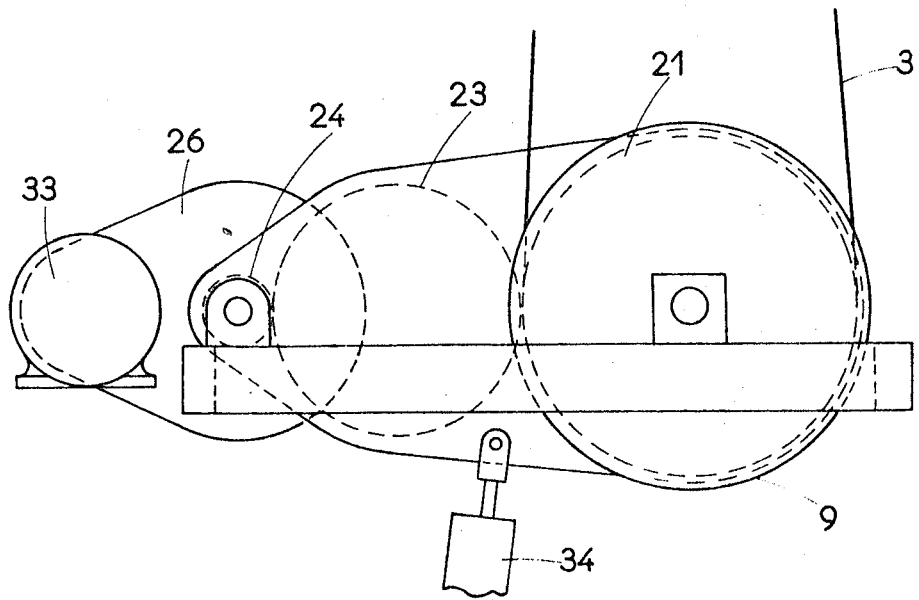
FIG. 2 is a side view of the installation for driving a cable by means of one of the Koepe pulleys.

The system also comprises return means which promote pivoting of the frames 17 and 18 so as to tension the corresponding cable 3 or 4. The return means may simply be counterweights or else, as shown in FIG. 2, a jack 34. In the latter case, jack 34 can act as a shock absorber in the event of any oscillation of the cables.

The above-described system ensures mechanical balancing of the torque acting on the two Koepe traction pulleys of the two cables and the tension of the latter without any need for any supervision or operation by the personnel in charge of the ingot trucks 1.

Of course the invention is not limited by the details of the above-described embodiment, which can be modified without departing from the scope of the invention.

I claim:

1. A traction installation for moving objects running along a horizontal track, the movement being controlled by two parallel endless cables disposed on either side of the track, characterized in that is comprises two frames mounted to pivot about two axes in alignment with one another, each frame bearing a traction cable Koepe drive pulley, the axis of which is parallel to the frame pivot axis, two reduction gears each of which drives the spindle of one Koepe pulley and comprises a drive pinion the axis of which is in alignment with the frame pivot axes, a differential gear of the type having planet wheels mounted in a satellite carrier cage disposed between the reduction gears, the planet wheels of the differential gear being secured to the drive pinions and the satellite carrier cage being driven by at least one motor.

2. An installation according to claim 1, characterized in that each reduction gear is mounted in a casing secured to the corresponding frame of a Koepe pulley.

3. An installation according to claim 1, characterized in that a return system, such as a counterweight or a jack, is combined with each frame so that it tends to pivot in the direction of the traction of the corresponding cable.